| (12) | United States Patent | (10) Patent No.: | US 8,876,642 B2 |
|---|---|---|---|
| | Adams | (45) Date of Patent: | Nov. 4, 2014 |

(54) U-SHAPED CHAIN GUIDE BRACKET

(75) Inventor: Bradley F. Adams, Homer, NY (US)

(73) Assignee: BorgWarner Inc., Auburn Hills, MI (US)

( * ) Notice: Subject to any disclaimer, the term of this patent is extended or adjusted under 35 U.S.C. 154(b) by 135 days.

(21) Appl. No.: 13/256,733

(22) PCT Filed: Mar. 17, 2010

(86) PCT No.: PCT/US2010/027572

§ 371 (c)(1),
(2), (4) Date: Sep. 15, 2011

(87) PCT Pub. No.: WO2010/111079

PCT Pub. Date: Sep. 30, 2010

(65) Prior Publication Data

US 2012/0015769 A1   Jan. 19, 2012

Related U.S. Application Data

(60) Provisional application No. 61/162,438, filed on Mar. 23, 2009.

(51) Int. Cl.
*F16H 7/08*   (2006.01)
*F16H 7/18*   (2006.01)

(52) U.S. Cl.
CPC ....................................... *F16H 7/18* (2013.01)
USPC .......................................... 474/111; 474/140

(58) Field of Classification Search
USPC ................. 474/140, 144, 145, 111, 109, 110; 411/103, 104, 108, 226, 523, 999
See application file for complete search history.

(56) References Cited

U.S. PATENT DOCUMENTS

| 4,734,084 | A | * | 3/1988 | Nagano ............................ 474/80 |
| 4,826,468 | A |   | 5/1989 | Friedrichs |
| 5,045,032 | A | * | 9/1991 | Suzuki et al. .................. 474/140 |
| 5,055,088 | A | * | 10/1991 | Cradduck et al. ............. 474/111 |
| 5,779,582 | A |   | 7/1998 | Mott et al. |
| 5,961,411 | A | * | 10/1999 | Tsutsumi et al. .............. 474/111 |

(Continued)

FOREIGN PATENT DOCUMENTS

| CN | 1760568 A | 4/2006 |
| DE | 10333077 A1 | 2/2005 |

(Continued)

OTHER PUBLICATIONS

Chinese Office Action dated Mar. 21, 2014; Applicant Borg Warner Inc.; Application No. 201080010847.8; 15 pages.

(Continued)

*Primary Examiner* — William E Dondero
*Assistant Examiner* — Minh Truong
(74) *Attorney, Agent, or Firm* — BrooksGroup

(57) ABSTRACT

One exemplary embodiment includes a U-shaped chain guide bracket including a base wall extending in a longitudinal direction from an upstream end to a downstream end of the base wall, and a pair of laterally opposed side walls extending away from the base wall and having laterally opposed mounting pads and apertures. The base wall and opposed side walls establish an upstream end, a downstream end, a central portion between the upstream and downstream ends, and a general U-shaped cross-section at least at each of the upstream and downstream ends and at the central portion. The bracket is formed from sheet metal.

14 Claims, 3 Drawing Sheets

(56) References Cited

U.S. PATENT DOCUMENTS

| | | | |
|---|---|---|---|
| 6,013,000 A | 1/2000 | Moretz | |
| 6,039,525 A * | 3/2000 | Johnson | 411/353 |
| 6,302,816 B1 | 10/2001 | Wigsten | |
| 6,835,149 B2 * | 12/2004 | Konno et al. | 474/111 |
| 7,204,773 B2 * | 4/2007 | Ullein | 474/111 |
| 7,377,578 B2 * | 5/2008 | Ellison et al. | 296/193.07 |
| 7,951,029 B2 * | 5/2011 | Oota et al. | 474/111 |
| 8,308,588 B2 * | 11/2012 | Hewitt et al. | 474/111 |
| 2005/0049095 A1 | 3/2005 | Shum | |
| 2006/0089222 A1 | 4/2006 | Nakata | |
| 2006/0172836 A1 * | 8/2006 | Mori et al. | 474/111 |
| 2006/0205548 A1 * | 9/2006 | Konno | 474/111 |
| 2006/0266493 A1 | 11/2006 | Yoshida et al. | |
| 2006/0293136 A1 * | 12/2006 | Markley et al. | 474/140 |
| 2007/0149329 A1 * | 6/2007 | Ota et al. | 474/111 |
| 2009/0075769 A1 * | 3/2009 | Shintani et al. | 474/140 |
| 2009/0197724 A1 * | 8/2009 | Young | 474/133 |
| 2011/0306449 A1 * | 12/2011 | Adams | 474/111 |

FOREIGN PATENT DOCUMENTS

| | | |
|---|---|---|
| EP | 1645778 A2 | 4/2006 |
| GB | 2428766 A | 7/2007 |
| JP | 08004848 A | 1/1996 |
| JP | 2004060801 A | 2/2004 |
| JP | 2009014110 A | 1/2009 |

OTHER PUBLICATIONS

European Search Report dated Mar. 11, 2013; Application No. 10756601.01; Applicant BorgWarner Inc.; 6 pages.

European Office Action dated Jul. 25, 2013; Applicant: BorgWarner Inc.; Application No. 10756601.0; 6 pages.

Japanese Office Action dated Jul. 30, 2013; Applicant: BorgWarner Inc.; Application No. 2012-502102; 7 pages.

* cited by examiner

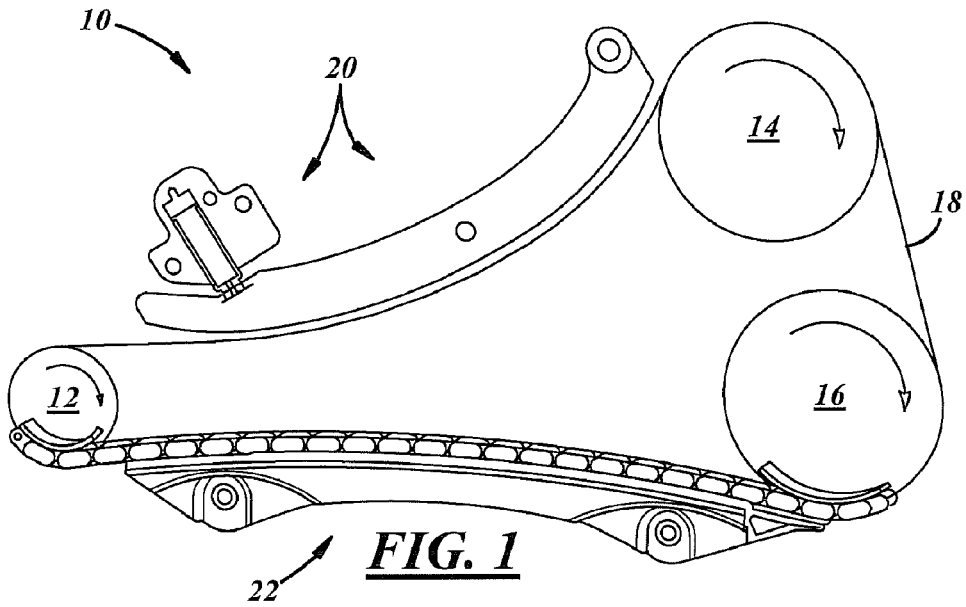
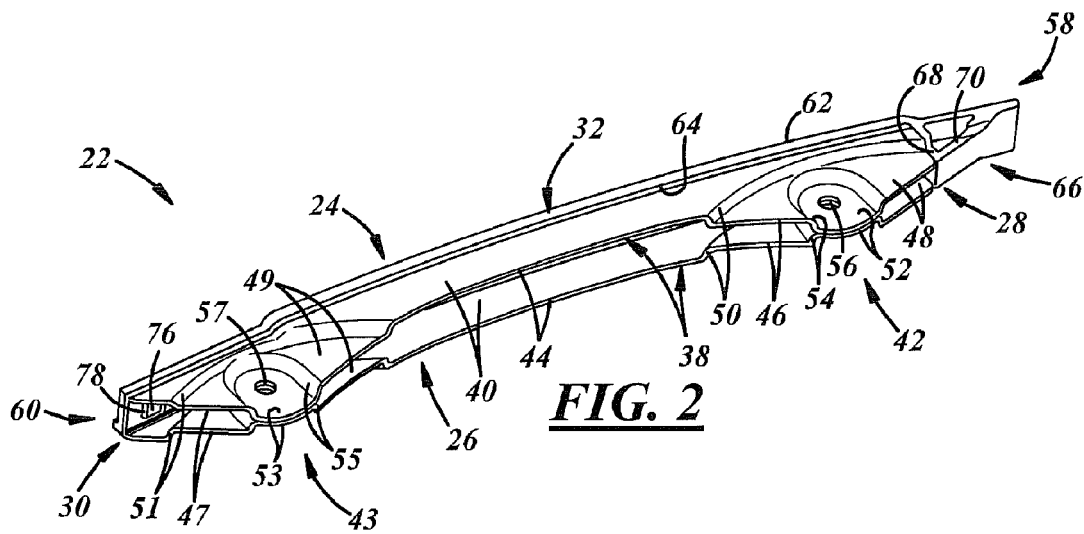
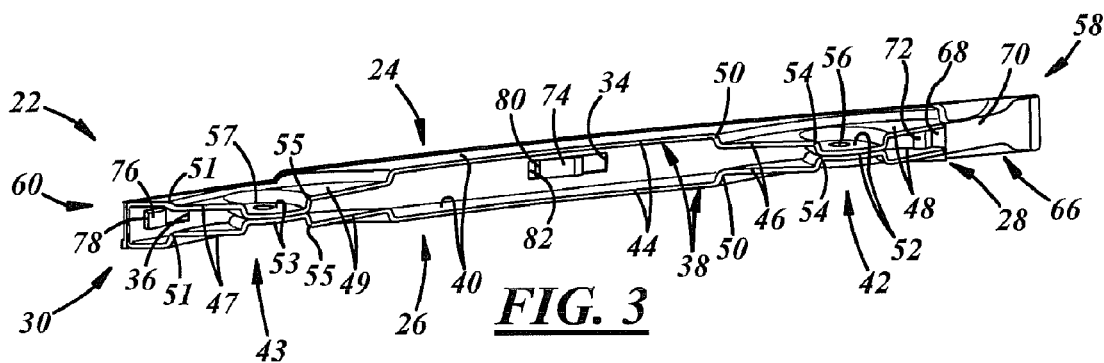

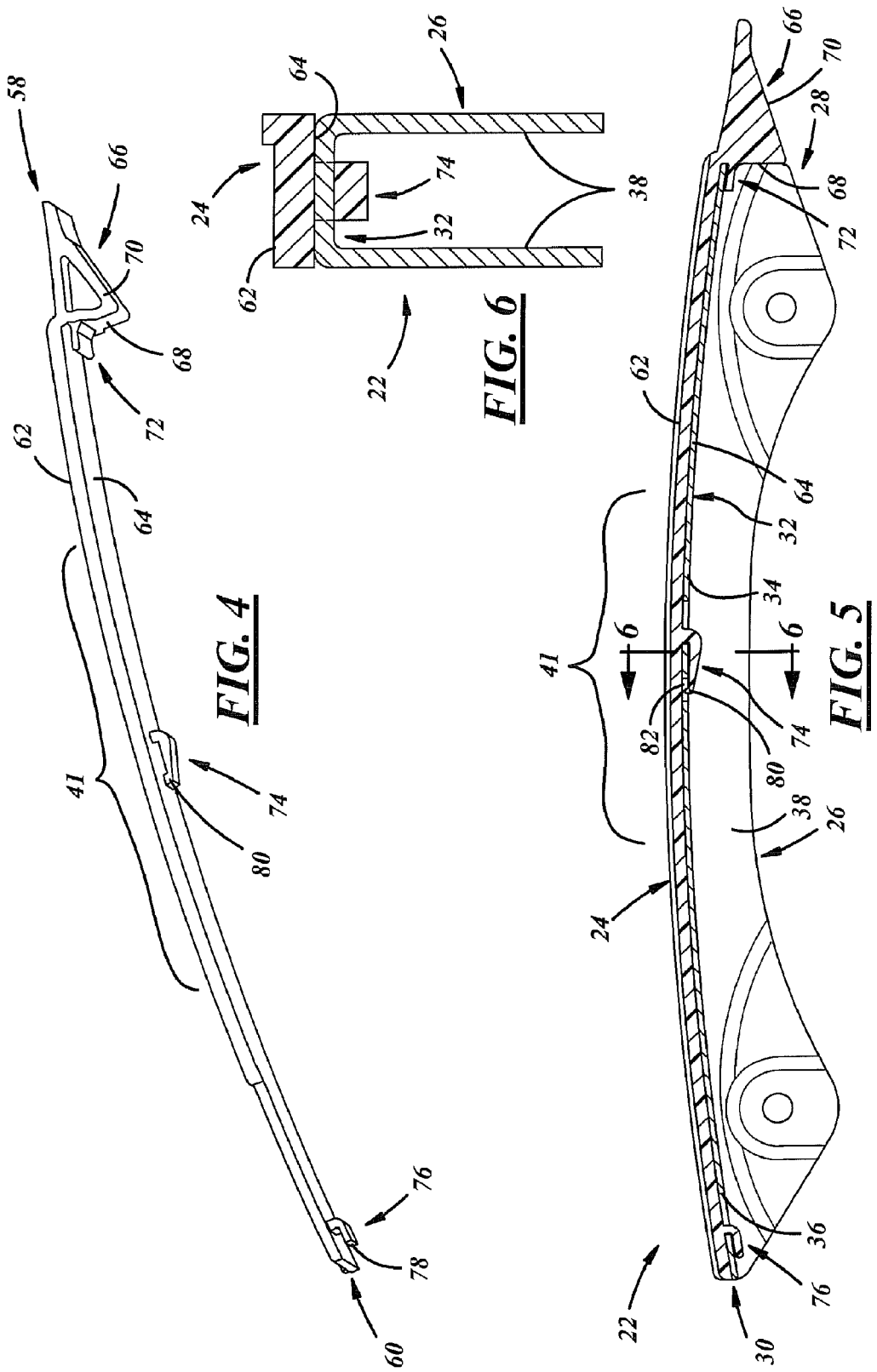

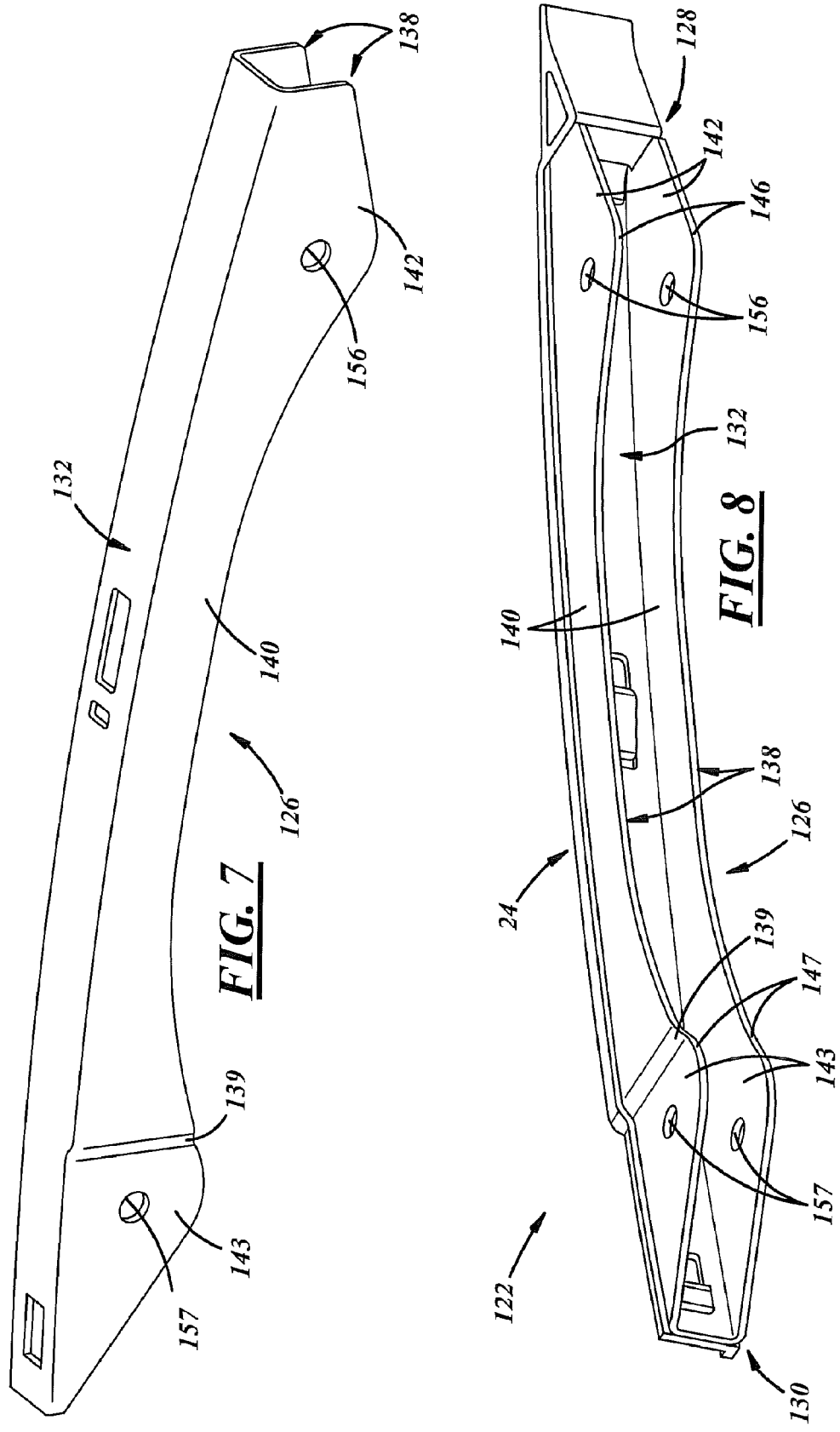

US 8,876,642 B2

U-SHAPED CHAIN GUIDE BRACKET

This application claims the benefit of U.S. Provisional Application Ser. No. 61/162,438 filed Mar. 23, 2009.

TECHNICAL FIELD

The field to which the disclosure generally relates includes endless belt power transmission components and, more particularly, a bracket for a timing chain guide.

BACKGROUND

An automotive engine typically includes a timing chain and a chain guide having a non-rotatable slide surface engageable with the chain to keep the chain tight and guide the chain along an intended path of travel whereby the chain slides over the slide surface of the guide. A chain guide may include one component composed of a durable plastic to define the slide surface for low friction, wear, and noise between the chain and the guide. Or a chain guide may include two individual components assembled together including a plastic slide shoe, and a metal or plastic support bracket to reinforce the slide shoe. Such conventional chain guides can be difficult to package in tight operating envelopes of engine timing chain systems. Also, when subjected to chain loads during operation, some conventional chain guides may deflect to an undesirable degree.

SUMMARY OF EXEMPLARY EMBODIMENTS

One exemplary embodiment includes a chain guide comprising a support bracket formed from sheet metal and a slide shoe molded from plastic and coupled to the support bracket. The support bracket includes an upstream end, a downstream end, and a central portion between the upstream and downstream ends. The bracket may have a general U-shaped cross-section at least at its upstream and downstream ends and at the central portion. The bracket also includes a base wall extending longitudinally from the upstream end toward the downstream end, and a pair of laterally opposed side walls extending away from the base wall and having laterally opposed mounting pads and apertures. The slide shoe includes an outer slide surface engageable with a chain, and an inner base surface corresponding to the base wall of the support bracket.

Another exemplary embodiment includes a chain guide bracket comprising a base wall extending in a longitudinal direction from an upstream end to a downstream end of the base wall, and a pair of laterally opposed side walls extending away from the base wall and having laterally opposed mounting pads and apertures. The base wall and opposed side walls establish an upstream end, a downstream end, a central portion between the upstream and downstream ends, and a general U-shaped cross-section at least at each of the upstream and downstream ends and at the central portion. The bracket is formed from sheet metal.

Other exemplary embodiments will become apparent from the detailed description provided hereinafter. It should be understood that the detailed description and specific examples, while disclosing exemplary embodiments, are intended for purposes of illustration only and are not intended to limit the scope of the claims.

BRIEF DESCRIPTION OF THE DRAWINGS

Exemplary embodiments will become more fully understood from the detailed description and the accompanying drawings, wherein:

FIG. 1 is perspective view of an exemplary timing chain apparatus illustrating an exemplary embodiment of a timing chain guide;

FIG. 2 is a side perspective view of the timing chain guide of FIG. 1 including one exemplary embodiment of a support bracket and a slide shoe carried by the support bracket;

FIG. 3 is a bottom perspective view of the timing chain guide of FIG. 1 including a support bracket and a slide shoe carried by the support bracket;

FIG. 4 is a perspective view of the slide shoe shown in FIGS. 2 and 3;

FIG. 5 is a longitudinal cross-sectional view of the timing chain guide of FIG. 1, illustrating interconnections between the support bracket and slide shoe of FIGS. 2 and 3;

FIG. 6 is a transverse cross-sectional view of the guide of FIG. 1;

FIG. 7 is a perspective view of another exemplary embodiment of a support bracket; and FIG. 8 is a perspective view of another exemplary embodiment of a timing chain guide including the support bracket of FIG. 7 and the slide shoe shown in FIG. 4.

DETAILED DESCRIPTION OF EXEMPLARY EMBODIMENTS

The following description of the exemplary embodiments is merely exemplary in nature and is in no way intended to limit the claims, their application, or uses.

An exemplary operating environment is illustrated in FIG. 1, and may be used with timing chain guides and components. The disclosed guides and components may be used with any suitable endless belt or chain power transmission system and, more specifically, may be carried out in conjunction with a timing chain system such as system 10. The following system description simply provides a brief overview of one exemplary system, but other systems and components not shown here could also support the guides and components.

In general, the system 10 may include a drive sprocket 12 that may be coupled to an engine crank shaft (not shown), driven sprockets 14, 16 that may be coupled to engine cam shafts (not shown), and a timing chain 18 coupled around the sprockets 12, 14, 16 to transmit rotational power from the crank shaft to the cam shafts. On a slack side of the chain 18, a chain tensioner apparatus 20 may be disposed to impose a variable force on the chain 18 to maintain the chain 18 in position on the sprockets 12, 14, 16. On a tight side of the chain 18, a chain guide 22 may be disposed to impose a generally fixed force on the chain 18 to keep the chain 18 in position. The chain guide 22 may be coupled to some structural portion of the engine, for example, an engine block or the like (not shown).

Referring now to FIGS. 2 and 3, the chain guide 22 includes a slide shoe 24 to cooperate with a chain (not shown), and a support bracket 26 to carry the slide shoe 24. The support bracket 26 may be bent, drawn, or otherwise formed from sheet metal and is of general U-shape in transverse cross-section. As used herein, the term transverse means perpendicular or at any other positive angle with respect to the general longitudinal upstream-to-downstream direction of the base wall. Also as used herein, directional words such as front, rear, top, bottom, upper, lower, radial, circumferential, axial, lateral, longitudinal, vertical, horizontal, transverse, and/or the like are employed by way of description and not limitation. The slide shoe 24 may be molded from plastic and is coupled in any suitable manner to the support bracket 26.

The support bracket 26 may include aluminum, steel or any other metal suitable for forming. For example, the bracket 26 may include SAE 1008 with a Rockwell hardness of 40 on the "B" scale. The design of the bracket 26 is such that the gage or thickness of the metal may be significantly less than that of conventional guide brackets of similar metal composition. For example, conventional steel brackets are usually 3 mm to 4 mm in gage or thickness. The support bracket 26 in steel may be about 1 mm to about 2 mm in gage or thickness. More specifically, the thickness of the bracket 26 may be about 1.25 mm to about 1.75 mm. Even more specifically, the thickness of the bracket 26 may be about 1.5 mm, plus or minus typical manufacturing tolerances in the art. Accordingly, the bracket 26 may be packaged in even tighter operating envelopes than ever before possible.

The support bracket 26 may include an upstream end 28 and a downstream end 30, and a base wall 32 extending longitudinally from the upstream end 28 toward the downstream end 30. The base wall 32 may be curved or arcuate in shape such that the base wall 32 is excurvate. Also, the base wall 32 may include one or more slide shoe apertures 34, 36 (FIG. 3) to accept corresponding portions of the slide shoe 24 for coupling of the slide shoe 24 to the base wall 32. As also shown in FIG. 6, the support bracket 26 also includes a pair of laterally opposed side walls 38 extending away from the base wall 32. The general U-shape of the bracket 26 may include rounded or square joints between the base wall 32 and the side walls 38.

Referring again to FIGS. 2 and 3, the side walls 38 may include a generally longitudinally extending central portion 40 and may include mounting pads 42, 43 disposed longitudinally upstream and downstream of the central portion 40. In other words, the central portion 40 is disposed longitudinally between the mounting pads 42, 43. The central portion 40 may be at least partially defined by side wall free edges 44 that may be incurvate, whereas the mounting pads 42, 43 may be at least partially defined by side wall free edges 46, 47 that may be excurvate and that project a greater distance from the base wall 32 compared to that of the central portion 40.

In one embodiment, the mounting pads 42, 43 also may be dished. For example, the mounting pads 42, 43 may be at least partially defined by one or more depressions or recesses in the side walls 38. More specifically, the mounting pads 42, 43 may be defined by first depressions 48, 49 in the side walls 38 between the excurvate free edges 46, 47 and the base wall 32. The first depressions 48, 49 may be at least partially defined by first steps 50, 51 in the side walls 38 that may be arcuate, and may contribute to the stiffness or rigidity of the bracket 26. Also, the mounting pads 42, 43 may be further defined by second depressions 52, 53 disposed within the first depressions 48, 49. The second depressions 52, 53 may be at least partially defined by second steps 54, 55 in the side walls 38 that may be in the shape of open-ended ovals, and may further contribute to the rigidity of the bracket 26.

The laterally opposed mounting pads 42, 43 may converge or extend laterally toward one another equal distances from lateral edges of the base wall 32 and may be generally symmetrical in cross section. Also, the profiles and magnitudes of the steps 50, 51, 54, 55 may be sized and shaped to correspond in any desired manner to any shape, height, width, depth, length, or the like of corresponding engine mounting bosses (not shown) and/or corresponding bolts, studs, or other like fasteners (not shown) used to mount the bracket 26 to the engine. The bracket 26 may include mounting apertures 56, 57 extending through the side walls 38 at the mounting pads 42, 43 and, more specifically, through the second depressions 52, 53. The apertures 56, 57 may be provided to accept bolts, studs, or other like fasteners (not shown) to mount the bracket 26 to an engine.

The support bracket 26 may be of U-shaped cross-section at its upstream and downstream ends 28, 30 and at the central portion 40. It is believed that the U-shape and/or the steps 50, 51, 54, 55 may provide such rigidity to the bracket 26 such that the gage or thickness of the bracket 26 may be reduced compared to conventional brackets and such that average height of the side walls 38 (e.g. average distance from the base wall 32 to the side wall free edges 44, 46, 47) may be significantly less than that compared to the average height of conventional guides.

Referring to FIGS. 4 and 5, the slide shoe 24 may include upstream and downstream ends 58, 60 corresponding to the upstream and downstream ends 28, 30 of the support bracket 26. The slide shoe 24 also may include an outer slide surface 62 engageable with a chain (not shown), and an inner base surface 64 corresponding to the base wall 32 of the support bracket 26. At the upstream end 58, the slide shoe 24 may include a shear stop 66 in abutment with the upstream end 28 of the support bracket 26. The shear stop 66 may include a stop wall 68 extending from the inner base surface 64, and an angled support wall 70 extending from the end of the stop wall 68 to the inner base surface 64 at the upstream end 58.

Also, the slide shoe 24 may include one or more attachment features. For example, the slide shoe 24 may include a first attachment tab 72 (FIG. 3) that may be cantilevered from the stop wall 68 of the shear stop 66 at a location adjacent the inner base surface 64, a second attachment tab 74 cantilevered from the inner base surface 64 in a central portion 41 of the shoe 24, and a third attachment tab 76 extending from the inner base surface 64 adjacent the downstream end 60 of the shoe 24. The first attachment tab 72 is provided for cooperation with an edge of the bracket 26 at the upstream end 28 of the bracket 26. The second and third attachment tabs 74, 76 are provided for insertion into the corresponding slide shoe apertures 34, 36 of the base wall 32 of the support bracket 26 to couple the slide shoe 24 to the support bracket 26. The third attachment tab may include a free end 78 adjacent the downstream end 30 of the bracket 26. As shown in FIG. 3, the second attachment tab 74 may include a snap-fit projection 80 at a distal or free end that may cooperate with a snap-fit aperture 82 in the base wall 32 of the support bracket 26. Accordingly, the shoe 24 may be snap-fit to the bracket 26 to resist separation of the shoe 24 from the bracket 26.

The slide shoe 24 may include any durable material, such as a durable polymeric material. For example, the slide shoe 24 may include a polyamide, for instance, NYLON 6,6 or the like.

FIGS. 7 and 8 illustrate another exemplary embodiment of a chain guide 122 including the slide shoe 24 and another exemplary embodiment of a support bracket 126. This embodiment is similar in many respects to the embodiment of FIGS. 1 through 6 and like numerals between the embodiments generally designates like or corresponding elements throughout the several views of the drawing figures. Additionally, the descriptions of the embodiments are incorporated by reference into one another and the common subject matter generally may not be repeated here.

The support bracket 126 may include a base wall 132 and a pair of laterally opposed side walls 138 extending away from the base wall 132. In this embodiment, the side walls 138 may include mounting pads 142, 143 on either side of a central portion 140 that are generally planar, although one or more may include a bend 139. The mounting pads 142, 143 may extend from lateral edges of the base wall 132 to free ends 146, 147 of the side walls 138. Accordingly, the support bracket 126 may be of U-shaped cross-section at upstream and downstream ends 128, 130, at the central portion 140, and at the mounting pads 142, 143. In other words, the support bracket 126 is substantially of U-shaped transverse cross section from its upstream end 128 to its downstream end 130, with the exception of the bend 139.

The bracket 126 may include mounting apertures 156, 157 extending through the side walls 138 at the mounting pads 142, 143. The apertures 156, 157 may be provided to accept dowels, or other like devices (not shown) to mount the bracket to an engine.

With one or both of the aforementioned embodiments, a chain guide may be lighter, shorter in height, and composed of a lower grade material than conventional guides and, thus, may be cheaper in comparison and yet may provide as good or improved strength or rigidity to resist deflection.

The above description of embodiments is merely exemplary in nature and, thus, variations thereof are not to be regarded as a departure from the spirit and scope of the claims.

What is claimed is:

1. A chain guide comprising:
   a support bracket formed from sheet metal and including:
   an upstream end,
   a downstream end,
   a central portion between the upstream and downstream ends,
   a general U-shaped cross-section at least at each of the upstream and downstream ends and at the central portion,
   a base wall extending longitudinally from the upstream end toward the downstream end, and
   a pair of laterally opposed side walls extending away from the base wall each having a first and a second laterally opposed mounting pad and aperture, wherein the first laterally opposed mounting pads are dished so as to converge toward one another and are located between the central portion and the upstream end, and wherein the second laterally opposed mounting pads are dished so as to converge toward one another and are located between the central portion and the downstream end, and wherein the apertures extend through the laterally opposed side walls at each of the laterally opposed mounting pads, and
   a slide shoe molded from plastic and coupled to the support bracket and including:
   an outer slide surface engageable with a chain, and
   an inner base surface corresponding to the base wall of the support bracket.

2. The chain guide of claim 1 wherein the slide shoe further includes a shear stop in abutment with the upstream end of the support bracket, the shear stop including a stop wall extending from the inner base surface of the slide shoe.

3. The chain guide of claim 2 wherein the slide shoe includes a first attachment tab cantilevered from the stop wall of the shear stop, a second attachment tab cantilevered from the inner base surface at a central portion of the slide shoe, and a third attachment tab cantilevered from the inner base surface at a downstream end of the slide shoe.

4. The chain guide of claim 1 wherein the slide shoe is snap-fit to the support bracket.

5. The chain guide of claim 4 wherein the base wall of the support bracket includes an attachment tab aperture and an adjacent snap-fit aperture, and wherein the slide shoe includes a cantilevered attachment tab extending from the inner surface of the slide shoe into the attachment tab aperture of the base wall and having a snap-fit projection extending into the snap-fit aperture.

6. A chain guide bracket comprising:
   a base wall extending in a longitudinal direction from an upstream end to a downstream end of the base wall; and
   a pair of laterally opposed side walls extending away from the base wall each having a first and a second laterally opposed mounting pad and aperture,
   wherein the base wall and opposed side walls establish an upstream end, a downstream end, a central portion between the upstream and downstream ends, and a general U-shaped cross-section at least at each of the upstream and downstream ends and at the central portion,
   wherein the first laterally opposed mounting pads and apertures are located between the central portion and the upstream end and wherein the second laterally opposed mounting pads and apertures are located between the central portion and the downstream end;
   wherein the chain guide bracket is formed from sheet metal, and
   wherein the first laterally opposed mounting pads are dished so as to converge toward one another, and wherein the second laterally opposed mounting pads are dished so as to converge toward one another, and wherein each of the first and the second laterally opposed mounting pads include:
   a first depression at least partially defined by a first step, and
   a second depression including the apertures, the second depression disposed within the first depression and at least partially defined by a second step,
   wherein the first step is arcuate in profile and the second step is open-ended oval in profile.

7. A chain guide bracket comprising:
   a base wall extending in a longitudinal direction from an upstream end to a downstream end of the base wall;
   a pair of laterally opposed side walls extending away from the base wall each having a first laterally opposed mounting pad and aperture and a second laterally opposed mounting pad and aperture;
   wherein the base wall and opposed side walls establish an upstream end, a downstream end, a central portion between the upstream and downstream ends, and a general U-shaped cross-section at least at each of the upstream and downstream ends and at the central portion;
   wherein the first laterally opposed mounting pads are dished so as to converge toward one another and are located between the central portion and the upstream end and wherein the second laterally opposed mounting pads are dished so as to converge toward one another and are located between the central portion and the downstream end, and wherein the apertures extend through the laterally opposed side walls at each of the laterally opposed mounting pads; and
   wherein the chain guide bracket is formed from sheet metal.

8. The chain guide bracket of claim 7 wherein the dished mounting pads include a first depression at least partially defined by a first step.

9. The chain guide bracket of claim 8 wherein the dished mounting pads further include a second depression disposed within the first depression and at least partially defined by a second step.

10. The chain guide bracket of claim 9 wherein the first step is arcuate in profile and the second step is an open-ended oval in profile.

11. The chain guide bracket of claim 7 wherein the mounting pads are generally planar and the chain guide bracket is substantially U-shaped from the upstream end to the downstream end.

12. The chain guide bracket of claim 7 wherein the chain guide bracket is drawn from steel and is about 1 mm to about 2 mm in thickness.

13. The chain guide bracket of claim 12 wherein the chain guide bracket is about 1.25 mm to about 1.75 mm in thickness.

14. The chain guide bracket of claim 13 wherein the chain guide bracket comprises SAE 1008 steel and is about 1.5 mm in thickness.

* * * * *